United States Patent
Nelson et al.

(10) Patent No.: US 6,563,918 B1
(45) Date of Patent: May 13, 2003

(54) TELECOMMUNICATIONS SYSTEM ARCHITECTURE FOR CONNECTING A CALL

(75) Inventors: Tracy Lee Nelson, Shawnee Mission, KS (US); William Lyle Wiley, Olathe, KS (US); Royal Dean Howell, Trimble, MO (US); Michael Joseph Gardner, Overland Park, KS (US); Albert Daniel DuRee, Independence, MO (US)

(73) Assignee: Sprint Communications Company, LP, Overland Park, KS (US)

( * ) Notice: Subject to any disclaimer, the term of this patent is extended or adjusted under 35 U.S.C. 154(b) by 0 days.

(21) Appl. No.: 09/026,906

(22) Filed: Feb. 20, 1998

(51) Int. Cl.[7] .......................... H04M 7/00; H04L 12/28
(52) U.S. Cl. ................. 379/230; 379/221.08; 370/385; 370/395.2; 370/397; 370/409; 370/465; 370/522
(58) Field of Search ................. 379/207.02, 221.08, 379/221.09, 221.13, 229, 230; 370/259, 385, 395.2, 396, 397, 400, 401, 402, 409, 426, 465, 466, 467, 468, 522, 524

(56) References Cited

U.S. PATENT DOCUMENTS

| | | |
|---|---|---|
| 4,201,889 A | 5/1980 | Lawrence et al. |
| 4,310,727 A | 1/1982 | Lawser |
| 4,348,554 A | 9/1982 | Asmuth |
| 4,453,247 A | 6/1984 | Suzuki et al. |
| 4,554,659 A | 11/1985 | Blood et al. |
| 4,565,903 A | 1/1986 | Riley |
| 4,683,563 A | 7/1987 | Rouse et al. |

(List continued on next page.)

FOREIGN PATENT DOCUMENTS

| | | |
|---|---|---|
| EP | 90312739.7 | 7/1991 |
| EP | 91303312.2 | 10/1991 |
| EP | 91311342.9 | 7/1992 |
| EP | 92307752.3 | 9/1993 |
| JP | 870284896 | 5/1989 |
| JP | 07050057 | 9/1996 |
| WO | WO94/06251 | 3/1994 |
| WO | WO95/04436 | 2/1995 |

OTHER PUBLICATIONS

Tanabe, Shirou, Taihei, Suzuki, and Ohtsuki, Ken–Ichi, "A New Distributed Switching System Architecture for B–ISDN," International Conference on Integrated Broadband Services and Networks, Oct. 15–18, 1990, The Institution of Electrical Engineers, Savoy Place, London.

Palmer, Rob, "An Experimental ATM Network for B–ISDN Research," IEEE 1992, Melbourne, Australia.

Thomas F. Laporta, "Distributed Call Processing for Wireless Mobile Networks," Bell Labs Technical Journal, vol. 1 (No. 1), pp. 127–142, (Oct., 1996).

(List continued on next page.)

*Primary Examiner*—Harry S. Hong
(74) *Attorney, Agent, or Firm*—Harley R. Ball; Steven J. Funk; Kevin D. Robb

(57) ABSTRACT

An architecture for connecting a call comprises a call processor, a signaling interface, a call process control system (CPCS), and an interworking unit. The signaling interface receives, transmits, and processes call signaling so that call signaling is received into, or transported from, the architecture through the signaling interface. The call processor processes the call signaling to select connections for calls. The CPCS receives data fills from translations, processes the data to be in a format compatible with the call processor, and fills the data into tables in the call processor. The CPCS also interfaces through the signaling processor with other systems, such as accounting systems and operations centers. The interworking unit interworks user communications between time division multiplex and asynchronous transfer mode connections and between time division multiplex connections and other time division multiplex connections.

20 Claims, 9 Drawing Sheets

U.S. PATENT DOCUMENTS

| | | |
|---|---|---|
| 4,720,850 A | 1/1988 | Oberlander |
| 4,730,312 A | 3/1988 | Johnson |
| 4,736,364 A | 4/1988 | Basso et al. |
| 4,748,658 A | 5/1988 | Gopal |
| 4,763,317 A | 8/1988 | Lehman |
| 4,823,338 A | 4/1989 | Chan et al. |
| 4,853,955 A | 8/1989 | Thorn et al. |
| 4,896,319 A | 1/1990 | Lidinsky et al. |
| 4,916,690 A | 4/1990 | Barri |
| 4,926,416 A | 5/1990 | Weik |
| 4,979,118 A | 12/1990 | Kheradpir |
| 4,985,889 A | 1/1991 | Frankish et al. |
| 4,991,204 A | 2/1991 | Yamamoto et al. |
| 4,993,104 A | 2/1991 | Gordon |
| 5,003,584 A | 3/1991 | Benyacar |
| 5,018,191 A | 5/1991 | Catron et al. |
| 5,048,081 A | 9/1991 | Gavaras |
| 5,058,104 A | 10/1991 | Yonehara et al. |
| 5,067,123 A | 11/1991 | Hyodo et al. |
| 5,084,867 A | 1/1992 | Tachibana et al. |
| 5,089,954 A | 2/1992 | Rago |
| 5,091,903 A | 2/1992 | Schrodi |
| 5,101,404 A | 3/1992 | Kunimoto et al. |
| 5,115,431 A | 5/1992 | Williams et al. |
| 5,163,057 A | 11/1992 | Grupp |
| 5,168,492 A | 12/1992 | Beshai et al. |
| 5,185,743 A | 2/1993 | Murayama |
| 5,193,110 A | 3/1993 | Jones et al. |
| 5,204,857 A | 4/1993 | Obara |
| 5,216,669 A | 6/1993 | Hofstetter et al. |
| 5,218,602 A | 6/1993 | Grant et al. |
| 5,231,631 A | 7/1993 | Buhrke et al. |
| 5,231,633 A | 7/1993 | Hluchyi et al. |
| 5,233,607 A | 8/1993 | Barwig et al. |
| 5,239,539 A | 8/1993 | Uchida et al. |
| 5,249,178 A | 9/1993 | Kurano et al. |
| 5,251,255 A | 10/1993 | Epley |
| 5,253,247 A | 10/1993 | Hirose et al. |
| 5,255,266 A | 10/1993 | Watanabe et al. |
| 5,258,752 A | 11/1993 | Fukaya et al. |
| 5,258,979 A | 11/1993 | Oomuro et al. |
| 5,268,895 A | 12/1993 | Topper |
| 5,271,010 A | 12/1993 | Miyake |
| 5,274,680 A | 12/1993 | Sorton et al. |
| 5,278,889 A | 1/1994 | Papanicolaou et al. |
| 5,282,244 A | 1/1994 | Fuller et al. |
| 5,285,441 A | 2/1994 | Bansal et al. |
| 5,291,479 A | 3/1994 | Vaziri et al. |
| 5,306,318 A | 4/1994 | Bachhuber et al. |
| 5,311,509 A | 5/1994 | Heddes et al. |
| 5,317,562 A | 5/1994 | Nardin et al. |
| 5,323,389 A | 6/1994 | Bitz et al. |
| 5,327,421 A | 7/1994 | Hiller et al. |
| 5,327,433 A | 7/1994 | Hall |
| 5,329,308 A | 7/1994 | Binns et al. |
| 5,339,318 A | 8/1994 | Tanaka |
| 5,345,443 A | 9/1994 | D'Ambrogio et al. |
| 5,345,445 A | 9/1994 | Hiller |
| 5,345,446 A | 9/1994 | Hiller |
| 5,357,510 A | 10/1994 | Norizuki et al. |
| 5,363,433 A | 11/1994 | Isono |
| 5,365,524 A | 11/1994 | Hiller et al. |
| 5,367,566 A | 11/1994 | Moe et al. |
| 5,373,504 A | 12/1994 | Tanaka et al. |
| 5,375,124 A | 12/1994 | D'Ambrogio |
| 5,377,186 A | 12/1994 | Wegner |
| 5,384,771 A | 1/1995 | Isidoro et al. |
| 5,384,840 A | 1/1995 | Blatchford et al. |
| 5,392,402 A | 2/1995 | Robrock |
| 5,394,393 A | 2/1995 | Brisson et al. |
| 5,394,398 A | 2/1995 | Rau |
| 5,414,701 A | 5/1995 | Shtayer et al. |
| 5,418,783 A | 5/1995 | Yamaki et al. |
| 5,420,857 A | 5/1995 | Jurkevich |
| 5,420,858 A | 5/1995 | Marshall et al. |
| 5,420,916 A | 5/1995 | Sekiguchi |
| 5,422,882 A | 6/1995 | Hiller |
| 5,425,090 A | 6/1995 | Orriss |
| 5,426,636 A | 6/1995 | Hiller et al. |
| 5,428,607 A | 6/1995 | Hiller et al. |
| 5,428,609 A | 6/1995 | Eng et al. |
| 5,434,852 A | 7/1995 | LaPorta |
| 5,434,981 A | 7/1995 | Lenihan et al. |
| 5,440,563 A | 8/1995 | Isidoro et al. |
| 5,444,713 A | 8/1995 | Backaus et al. |
| 5,446,738 A | 8/1995 | Kim et al. |
| 5,452,297 A | 9/1995 | Hiller et al. |
| 5,453,981 A | 9/1995 | Katsube et al. |
| 5,454,034 A | 9/1995 | Martin |
| 5,457,684 A | 10/1995 | Bharucha |
| 5,461,669 A | 10/1995 | Vilain |
| 5,463,620 A | 10/1995 | Sriram |
| 5,463,621 A | 10/1995 | Suzuki |
| 5,473,677 A | 12/1995 | D'Amato |
| 5,473,679 A | 12/1995 | LaPorta |
| 5,477,537 A | 12/1995 | Dankert et al. |
| 5,479,401 A | 12/1995 | Bitz et al. |
| 5,479,402 A | 12/1995 | Hata et al. |
| 5,479,495 A | 12/1995 | Blumhardt |
| 5,483,527 A | 1/1996 | Doshi et al. |
| 5,485,455 A | 1/1996 | Dobbins et al. |
| 5,495,484 A | 2/1996 | Self et al. |
| 5,504,742 A | 4/1996 | Kakuma et al. |
| 5,506,844 A | 4/1996 | Rao |
| 5,509,010 A | 4/1996 | LaPorta |
| 5,509,123 A | 4/1996 | Dobbins et al. |
| 5,513,178 A | 4/1996 | Tanaka |
| 5,513,355 A | 4/1996 | Doellinger et al. |
| 5,519,707 A | 5/1996 | Subramanian et al. |
| 5,521,910 A | 5/1996 | Matthews |
| 5,522,042 A | 5/1996 | Fee et al. |
| 5,526,414 A | 6/1996 | Bedard et al. |
| 5,533,106 A | 7/1996 | Blumhardt |
| 5,539,698 A | 7/1996 | Kozaki et al. |
| 5,539,815 A | 7/1996 | Samba |
| 5,539,816 A | 7/1996 | Pinard et al. |
| 5,539,884 A | 7/1996 | Robrock |
| 5,541,918 A | 7/1996 | Ganmukhi et al. |
| 5,541,926 A | 7/1996 | Saito et al. |
| 5,544,152 A | 8/1996 | Obermanns et al. |
| 5,544,161 A | 8/1996 | Bigham et al. |
| 5,546,398 A | 8/1996 | Tucker et al. |
| 5,548,580 A | 8/1996 | Buckland |
| 5,550,819 A | 8/1996 | Duault |
| 5,550,820 A | 8/1996 | Baran |
| 5,550,914 A | 8/1996 | Clarke et al. |
| 5,563,939 A | 10/1996 | La Porta et al. |
| 5,566,173 A | 10/1996 | Steinbrecher |
| 5,568,475 A | 10/1996 | Doshi |
| 5,570,368 A | 10/1996 | Murakami et al. |
| 5,572,583 A | 11/1996 | Wheeler, Jr. et al. |
| 5,577,039 A | 11/1996 | Won et al. |
| 5,579,311 A | 11/1996 | Chopping et al. |
| 5,587,999 A | 12/1996 | Endo |
| 5,592,477 A | 1/1997 | Farris et al. |
| 5,600,640 A | 2/1997 | Blair et al. |
| 5,600,643 A | 2/1997 | Robrock |
| 5,623,491 A | 4/1997 | Skoog |
| 5,627,836 A | 5/1997 | Conoscenti et al. |
| 5,629,930 A | 5/1997 | Beshai et al. |
| 5,635,980 A | 6/1997 | Lin et al. |

| | | |
|---|---|---|
| 5,636,210 A | 6/1997 | Agrawal et al. |
| 5,640,446 A | 6/1997 | Everett et al. |
| 5,661,725 A | 8/1997 | Buck |
| 5,666,349 A | 9/1997 | Petri |
| 5,673,262 A | 9/1997 | Shimizu |
| 5,680,390 A | 10/1997 | Robrock |
| 5,703,876 A | 12/1997 | Christie |
| 5,708,702 A | 1/1998 | DePaul et al. |
| 5,710,769 A | 1/1998 | Anderson et al. |
| 5,719,863 A | 2/1998 | Hummel |
| 5,751,706 A | 5/1998 | Land |
| 5,825,780 A | 10/1998 | Christie |
| 5,835,584 A | 11/1998 | Penttonen |
| 5,844,895 A | 12/1998 | Gradisching |
| 5,848,128 A | 12/1998 | Frey |
| 5,867,562 A | 2/1999 | Scherer |
| 5,920,562 A | 7/1999 | Christie et al. |
| 5,926,482 A | 7/1999 | Christie |
| 5,940,393 A * | 8/1999 | Duree et al. ............... 370/392 |
| 5,940,487 A | 8/1999 | Bunch et al. |
| 5,940,491 A | 8/1999 | Anderson et al. |
| 5,991,301 A | 11/1999 | Christie |
| 6,002,689 A | 12/1999 | Christie et al. |
| 6,005,845 A | 12/1999 | Svennesson et al. |
| 6,016,343 A | 1/2000 | Hogan et al. |
| 6,023,474 A | 2/2000 | Gardner |
| 6,031,840 A | 2/2000 | Christie |
| 6,061,364 A | 5/2000 | Hager et al. |
| 6,081,529 A | 6/2000 | Christie |
| 6,137,800 A * | 10/2000 | Wiley et al. ............... 370/258 |
| 6,181,703 B1 | 1/2001 | Christie et al. |
| 6,314,103 B1 * | 11/2001 | Medhat et al. ........... 370/395.2 |

OTHER PUBLICATIONS

Beckman, Richard T. and Matthews, Joseph R., "Proposal for a Physical Architecture Based on the Harmonized Functional Architecture," Committee T1 Contribution T1S1.5/95–027, Bellcore, (Feb. 20, 1995).

Yoshikai, N., et al., "Report of the Meeting of SWP 13/1–4 (Draft Recommendation I.580)," ITU–T Telecommunication Standardization Sector, Study Group 13, pp. 1–51, (Mar. 7–18, 1994).

N/A, "Final Draft Text for Broadband Capability Set 2 Signaling Requirements, Attachment "D" Special Drafting Meeting," ITU–T Telecommunications Standardization Sector, Study Group 11, p. 1–127, (Sep. 13–22, 1993).

Ohta, S., et al., "A Dynamically Controllable ATM Transport Network Based on the Virtual Path Concept," Communications for the Information Age, Globecom'88, Conference Record, p. 1272–1276, (Nov. 28–Dec. 1, 1988).

Fukazawa, M., et al., "Intelligent Network Call Model for Broadband ISDN," Fujitsu Laboratories, Ltd. (Japan), p. 30.6.1–30.6.5.

Minzer, Steven, "A Signaling Protocol for Complex Multimedia Services," IEEE Journal on Selected Areas in Communications (ISSN 0733–8716), vol. 9 ( No. 9), p. 1383–1394, (Dec. 1991).

Faynberg, I., et al., "The Support of Network Interworking and Distributed Context Switching in the IN Service Data Function Model," 2nd Colloque International, ICIN 92, p. 11–16, (Mar. 1992).

Woodworth, Clark B., et al., "A Flexible Broadband Packet Switch for a Multimedia Integrated Network," International Conference on Communications, Denver, ICC–91, p. 3.2.1–3.2.8, (Jun. 1991).

Miller, P., "Intelligent Network/2: A flexible framework for exchange services," Bell Communications Research EXCHANGE, vol. 3 ( No. 3), (May/Jun. 1987).

Cooper, C., et al., "Toward a Broadband Congestion Control Strategy," IEEE Network, The Magazine of Computer Communications, (May 1990).

Batten, A., "A Personal Communications Services and the Intelligent Network," British Telecommunications Engineering, (Aug. 1990).

Fujioka, M., et al., "Universal Service Creation and Provision Environment for Intelligent Network," IEEE Communications Magazine, (Jan. 1991).

Andrews, F., "Switching in a Competitive Market," IEEE Communications Magazine, (Jan. 1991).

N/A, "Network Signaling," Telephony, TCX12004, University of Excellence, p. 5.8–5.17, (Oct. 21, 1991).

Garrahan, J.J., et al., "Intelligent Network Overview," IEEE Communications Magazine, p. 30–36, (Mar. 1993).

Johnson, M.A., et al., "New Service Testing Functions for Advanced Intelligent Networks," IEEE 1992 Network Operations and Management Symposium, p. 709–720, (Apr. 6, 1992).

Yeh, S.Y., et al., "The Evolving Intelligent Network Architecture," IEEE Conference on Computer and Communication Systems, p. 835–839, (1990).

Atoui, M., "Virtual Private Network Call Processing in the Intelligent Network," International Conference on Communications, p. 561–565, (1992).

Bosco, P., et al., "A Laboratory for AIN Service Design and Validation," International Conference on Communications, p. 566–571, (Jun. 14, 1992).

Homa, J., et al., "Intelligent Network Requirements for Personal Communications Services," IEEE Communications Magazine, p. 70–76, (Feb. 1992).

Russo, E.G., et al., "Intelligent Network Platforms in the U.S.," AT&T Technical Journal, p. 26–43, (1991).

Van Den Broek, W., et al., "RACE 2066–Functional models of UMTS and integration into the future networks," Electronics & Communications Engineering Journal, p. 165–172, (Jun. 1993).

Pinkham, G., et al., "The Ericsson Approach to Intelligent Networks," IEEE Global Telecommunications Conference & Exhibition, Session 10, paragraph 4, p. 320–324, (1988).

N/A, "ANSI–TI.111–1992, Signaling System No. 7 (SS7)— Message Transfer Part (MTP)," American National Standard for Telecommunications.

N/A, "ANSI–TI.112–1992, Signaling System No. 7 (SS7)— Signaling Connection Control Part (SCCP)," American National Standard for Telecommunications.

N/A, "ANSI–TI.113–1992, Signaling System No. 7 (SS7)— Integrated Services digital Network (ISDN) User Part," American National Standard for Telecommunications.

N/A, "ANSI–TI.113a–1993, Signaling System No. 7 (SS7)—Integrated Services Digital Network (ISDN) User Part (NxDSO Multi–rate Connection)," American National Standard for Telecommunications.

N/A, "ANSI–TI.113–1995, Signaling System No. 7 (SS7)— Integrated Services Digital Network (ISDN) User Part," American National Standard for Telecommunications.

N/A, "ATM at a Glance," Transmission Technologies Access Guide, p. 40–42, (1993).

Paglialunga, A., "ISCP Baseline Document (VER 3.1)," ITU Telecommunication Standardization Sector, Centre Studi E Laboratori Telecomunicazioni S.p.A., (1993).

N/A, "A Technical Report on SPEECH PACKETIZATION," Document T1A1/94—Prepared by T1A1.7, Working Group on Specialized Signal Processing.

N/A, "Draft Revised Recommendation I.580," ITU—Telecommunication Standardization Sector, Study Group 13, (Jul. 10–21, 1995).

Sprague, David, "MTP Level–3 Gateway STP Release 3.2.0," TEKELEC, p. 1–48, (Aug. 4, 1995).

McDysan, David E. and Spohn, Darren L., "ATM Theory and Application," ATM Layer VPI/VCI Level Addressing, p. 256: 9.3.1, (1994).

Minoli, Daniel and Dobrowski, George, "Principles of Signaling for Cell Relay and Frame Relay," DVI Comm., Inc. / Stevens Institute of Technology / Bell Comm. Research (Bellcore), p. 1–2, 5–6 and 229, (1994).

N/A, "B–IDSN ATM Adaptation Layer (AAL) Specification, Types 1 & 2," ITU Draft Recommendation I.363.1, (Jul. 21, 1995).

N/A, "Circuit Emulation Service Interoperability Specification Version 2.0 (Baseline Draft), 95–1504," The ATM Forum Technical Committee, (Dec. 1995).

N/A, "IN/B–ISDN Signalling Three Ways of Integration," ITU—Telecommunication Standardization Sector, Study Group 11, (Nov. 29–Dec. 17, 1993).

N/A, "Interworking B–ISUP and Q.93B for DDI, MSN, TP and SUB," ITU—Telecommunication Standardization Sector, Study Group 11, (Nov. 29–Dec. 17, 1993).

N/A, "Revised Draft of Q.2650 (DSS2/B–ISUP Interworking Recommendation)," ITU—Telecommunication Standardization Sector, Study Group 11, (Nov. 29–Dec. 17, 1993).

N/A, "Draft Broadband / Narrowband NNI interworking recommendation," ITU—Telecommunication Standardization Sector, Study Group 11, (Dec. 1993).

N/A, "Draft Recommendation Q.2761," ITU—Telecommunication Standardization Sector, Study Group 11, (Nov. 29–Dec. 17, 1993).

N/A, "Draft Recommendation Q.2762," ITU—Telecommunication Standardization Sector, Study Group 11, (Nov. 29–Dec. 17, 1993).

N/A, "Q.2931 Overview," ITU—Telecommunication Standardization Sector, (Nov. 29–Dec. 17, 1993).

N/A, "Clean final draft text for B–ISUP formats and codes (Q.2763) in ASN.1," ITU—Telecommunication Standardization Sector, Study Group 11, (Nov. 29–Dec. 17, 1993).

N/A, "Updated draft of Q.2764 (BQ.764)," ITU—Telecommunication Standardization Sector, Study Group 11, (Nov. 29–Dec. 17, 1993).

N/A, "Final B–ISUP SDLs," ITU—Telecommunication Standardization Sector, Study Group 11, (Nov. 29–Dec. 17, 1993).

N/A, "Draft Recommendation Q.2650," ITU—Telecommunication Standardization Sector, Study Group 11, (Nov. 29–Dec. 17, 1993).

N/A, "Revised Draft of Q.2650 (DSS2/B–ISUP Interworking Recommendation)," ITU—Telecommunication Standardization Sector, Study Group 11, (Nov. 29–Dec. 17, 1993).

N/A, "Revision of Recommendation of Q.850," ITU—T SG 11 WP 2, (Dec. 2–15, 1993).

N/A, "Draft Text for Q.2931 (CH. 1, 2 and 3)," ITU—Telecommunication Standardization Sector, Study Group 11, (Dec. 1993).

N/A, "Q.2931, Clause 4—Information Elements," ITU—Telecommunication Standardization Sector, (Nov. 29–Dec. 17, 1993).

N/A, "Section 5 of Q.93B," ITU—Telecommunication Standardization Sector, Study Group 11, (Nov. 29–Dec. 17, 1993).

N/A, "Chapter 6 of Recommendation Q.93B," ITU—Telecommunication Standardization Sector, Study Group 11, (Nov. 29–Dec. 17, 1993).

N/A, "Clauses 7 and 8 of Q.2931," ITU—Telecommunication Standardization Sector, Study Group 11, (Dec. 1993).

N/A, "Revised Q.2931 User Side SDL Diagrams," ITU—Telecommunication Standardization Sector, Study Group 11, (Nov. 29–Dec. 17, 1993).

N/A, "Revised Q.2931 Network Side SDL Diagrams," ITU—Telecommunication Standardization Sector, Study Group 11, (Nov. 29–Dec. 17, 1993).

N/A, "AnnexesB, C, D, F, H and I of Q.2931," ITU—Telecommunication Standardization Sector, Study Group 11, (Nov. 29–Dec. 17, 1993).

N/A, "Annex E of Recommendation Q.93B," ITU—Telecommunication Standardization Sector, Study Group 11, (Nov. 29–Dec. 17, 1993).

N/A, "Rec. Q.2931, Annex G—Status Monitoring of SPCs," ITU—Telecommunication Standardization Sector, Study Group 11, (Nov. 29–Dec. 17, 1993).

N/A, "Annex J of Q.2931," ITU—Telecommunication Standardization Sector, Study Group 11, (Dec. 1993).

N/A, "Appendix 1/Q.2931: Guidelines for the Use of Instruction Indicators," ITU—Telecommunication Standardization Sector, Study Group 11, (Nov. 29–Dec. 17, 1993).

N/A, "Draft text for Q.2931: Appendix II (Information Items Required for Connection Establishment and Routing in B–ISDN)," ITU—Telecommunication Standardization Sector, Study Group 11.

N/A, "General Recommendations on Telephone Switching and Signalling—Intelligent Network / Distributed Functional Plane for Intelligent Network CS–1," ITU–T Recommendation Q.1214.

Kumar, Sanjay, "Legacy Voice Service at a Native ATM Terminal," ATM_Forum/95–0917R1, ATM Forum Technical Committee, (Oct. 2–6, 1995).

Duault, Maurice, et al., "Baseline Text for Voice and Telephony Over ATM—ATM Trunking for Narrowband Services," ATM_Forum/95–0446R3, ATM Forum Technical Committee, (Oct. 2–6, 1995).

Choi, Don, "Requirements for ATM Trunking," ATM_Forum/95–1401, ATM Forum Technical Committee, (Oct. 2–6, 1995).

Chiang, Chin, "Proposed Changes to Proxy Signaling Capability," ATM Forum/95–0046, ATM Forum: Signaling Working Group, (Feb. 6–10, 1995).

Amin–Salehi, Bahman, "Third Party Call Setup for a Video–on Demand Connection Establishment," ATM_Forum/95–0022, ATM Forum Technical Committee, (Feb. 5–8, 1995).

Caves, Keith, "Proposed Modifications to the Baseline Text (95–0446R2) of the 'VTOA—ATM Trunking for Narrowband Services' Specification," ATM Forum/95–1134, ATM Forum Technical Committee, (Oct. 2–6, 1995).

Schink, Helmut, et al., "CES as a Flexible Trunking Method," ATM_Forum/95–1157, ATM Forum Technical Committee, (Oct. 2–6, 1995).

Duault, Maurice, "Proposal for ATM Trunking Options," ATM_Forum/95–1230, ATM Forum Technical Committee, (Oct. 2–6, 1995).

Okutani, Takenori, et al., "VTOA: Reference Configuration–ATM Trunking for Narrowband Services," ATM–Forum/95–1364, ATM Forum Technical Committee, (Oct. 2–6, 1995).

Stodola, Kevin, "Circuit Emulation Services Version 2 Baseline," ATM_Forum/95–1504, ATM Forum Technical Committee, (Dec. 11–15, 1995).

N/A, "I.751 Asynchronous Transfer Mode (ATM) Management View of the Network Element View," ITU—Telecommunication Standardization Sector, Study Group 15, (Nov. 13–24, 1995).

N/A, "Draft I.732," ITU—Telecommunication Standardization Sector, Study Group 15, (Nov. 13–24, 1995).

N/A, "Editorial Modifications for Draft New ITU–T Recommendation I.731," ITU—Telecommunication Standardiztion Sector, Study Group 15, (Nov. 13–24, 1995).

Buhrke, R.E., "Proposed Unified Functional Model," T1S1.5/95–036, Committee T1 Contribution, (Feb. 1995).

* cited by examiner

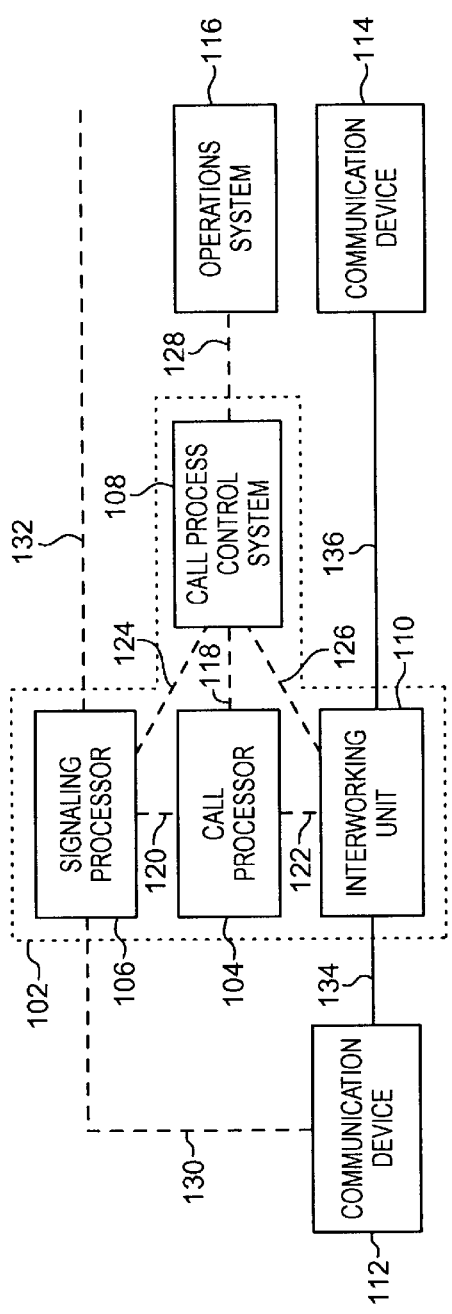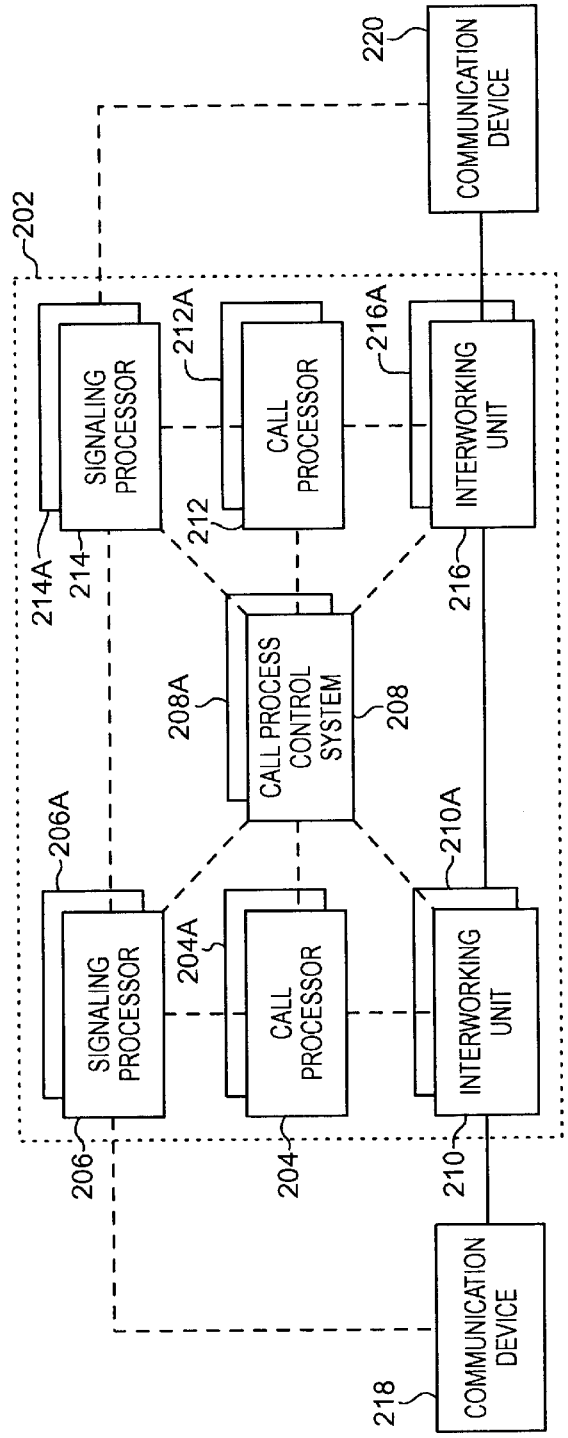

| ASSOCIATED POINT CODE | CIC | VP | VC | TRUNK GROUP NUMBER | GROUP MEMBER NUMBER | HARDWARE IDENTIFIER | ECHO CANCELER | ECHO CONTROL | SATELLITE INDICATOR | CIRCUIT STATUS | CIRCUIT STATE | TIME/ DATE |
|---|---|---|---|---|---|---|---|---|---|---|---|---|
| | | | | | | | | | | | | |
| | | | | | | | | | | | | |
| | | | | | | | | | | | | |

FIG. 6

| TRUNK GROUP NUMBER | GLARE RESOLUTION | CONTINUITY CONTROL | CLLI | SATELLITE TRUNK GROUP | SERVICE INDICATOR | NPA | SEL SEQ | HOP COUNTER | ACC ACTIVE | RE- ATTEMPT CIRCUIT | DEFAULT JIP/LRN | OMI | NEXT FUNCTION | NEXT INDEX |
|---|---|---|---|---|---|---|---|---|---|---|---|---|---|---|
| | | | | | | | | | | | | | | |
| | | | | | | | | | | | | | | |
| | | | | | | | | | | | | | | |

FIG. 7

| EXCEPTION TABLE INDEX | CARRIER SELECTION IDENTIFICATION | CARRIER IDENTIFICATION | NATURE OF ADDRESS | CALLED PARTY | | NEXT FUNCTION | NEXT INDEX |
|---|---|---|---|---|---|---|---|
| | | | | DIGITS FROM | DIGITS TO | | |
| | | | | | | | |
| | | | | | | | |
| | | | | | | | |

| ANI TABLE INDEX | CALLING PARTY CATEGORY | CALLING PARTY/CHARGE NUMBER ||| ORIGINATING LINE INFORMATION | NEXT FUNCTION | NEXT INDEX |
| | | NATURE OF ADDRESS | DIGITS FROM | DIGITS TO | DATA | | | |
| --- | --- | --- | --- | --- | --- | --- | --- | --- |
| | | | | | | | | |
| | | | | | | | | |
| | | | | | | | | |

FIG. 10

| CALLED NUMBER SCREENING TABLE INDEX | NATURE OF ADDRESS | DIGITS FROM | DIGITS TO | NEXT FUNCTION | NEXT INDEX |
| --- | --- | --- | --- | --- | --- |
| | | | | | |
| | | | | | |
| | | | | | |

FIG. 11

| LRN TABLE INDEX | NATURE OF ADDRESS | DIGITS FROM | DIGITS TO | NEXT FUNCTION | NEXT INDEX |
| --- | --- | --- | --- | --- | --- |
| | | | | | |
| | | | | | |
| | | | | | |

| CALLED NUMBER TABLE INDEX | NATURE OF ADDRESS | DIGITS FROM | DIGITS TO | NEXT FUNCTION | NEXT INDEX |
|---|---|---|---|---|---|
| | | | | | |
| | | | | | |

FIG. 12

| ROUTING TABLE INDEX | TRANSIT NETWORK SELECTION | | | CIRCUIT CODE | NEXT FUNCTION #1 | INDEX #1 | SIGNAL ROUTE | NEXT FUNCTION #2 | INDEX #2 | SIGNAL ROUTE | NEXT FUNCTION #3 | INDEX #3 | SIGNAL ROUTE |
|---|---|---|---|---|---|---|---|---|---|---|---|---|---|
| | NETWORK IDENTIFICATION | PLAN | DIGITS | | | | | | | | | | |
| | | | | | | | | | | | | | |
| | | | | | | | | | | | | | |

FIG. 13

| TREATMENT TABLE INDEX | MESSAGE RECEIVED CAUSE VALUE | GENERAL LOCATION | CODING STANDARD | CAUSE VALUE | NEXT FUNCTION | NEXT INDEX |
|---|---|---|---|---|---|---|
| | | | | | | |
| | | | | | | |

FIG. 14

| MESSAGE TYPE | PARAMETERS | INDEX #1 | INDEX # ... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | PRIVATE OPTIONAL | | | |
| ANSWER | ACCESS TRANSPORT | | | |
| | BACKWARD CALL INDICATOR | | | |
| | PRIVATE OPTIONAL | | | |
| CALL PROGRESS | EVENT INFORMATION | | | |
| | BACKWARD CALL INDICATOR | | | |
| | ACCESS TRANSPORT | | | |
| | CAUSE INDICATOR | | | |
| | OPTIONAL BACKWARD CALL INDICATOR | | | |
| CIRCUIT RESERVATION | NATURE OF CONNECTION INDICATOR | | | |
| CIRCUIT RESERVATION ACK | N/A | | | |
| CONFUSION | N/A | | | |
| CONTINUITY | CONTINUITY INDICATOR | | | |
| EXIT | OUTGOING TRUNK GROUP NUMBER | | | |
| INFORMATION | ALL PARAMETERS | | | |
| INFORMATION REQUEST | ALL PARAMETERS | | | |
| INITIAL ADDRESS | LNP SIGNALING INSTRUCTION PARAMETER | | | |
| | NATURE OF CONNECTION INDICATOR | | | |
| | FORWARD CALL INDICATOR | | | |
| | CALLING PARTY'S CATEGORY | | | |
| | USER SERVICE INFORMATION | | | |
| | CALLED PARTY NUMBER | | | |
| | ACCESS TRANSPORT | | | |
| | CALLING PARTY NUMBER | | | |
| | CARRIER IDENTIFICATION | | | |
| | CARRIER SELECTION INFORMATION | | | |
| | CHARGE NUMBER | | | |
| | GENERIC ADDRESS | | | |
| | JURISDICTION | | | |
| | ORIGINATING LINE INFORMATION | | | |
| | ORIGINAL CALLED NUMBER | | | |
| | REDIRECTING NUMBER | | | |
| | SERVICE CODE | | | |
| | TRANSIT NETWORK SELECTION | | | |
| | HOP COUNTER | | | |
| PASS ALONG | ALL PARAMETERS | | | |
| RELEASE | CAUSE INDICATOR | | | |
| | ACCESS TRANSPORT | | | |
| | AUTOMATIC CONGESTION CONTROL | | | |
| RELEASE COMPLETE | N/A | | | |
| RESUME | SUSPEND/RESUME INDICATOR | | | |
| SUSPEND | SUSPEND/RESUME INDICATOR | | | |

*FIG. 15*

TELECOMMUNICATIONS SYSTEM ARCHITECTURE FOR CONNECTING A CALL

RELATED APPLICATIONS

Not Applicable

FEDERALLY SPONSORED RESEARCH OR DEVELOPMENT

Not Applicable

MICROFICHE APPENDIX

Not Applicable

FIELD OF THE INVENTION

The present invention relates to the field of telecommunications call switching and transport in a system that provides asynchronous transfer mode connections.

BACKGROUND OF THE INVENTION

Broadband systems are being developed to provide telecommunications providers with many benefits, including more efficient use of network bandwidth and the ability to integrate voice, data, and video communications. Broadband systems provide telecommunications network users with increased capabilities at lower costs.

Telecommunications architectures provide call switching and call connections by processing signaling to determine the origination and destination of a call and by selecting a route or connection for the call. This call connection must be completed for local exchange companies as well as inter-exchange companies. In addition, the call is processed with services before, during, and after the call is connected. Some of these services include N00, calling card, and accounting system services.

Existing telecommunications architectures are not readily scaleable. Furthermore, it is not convenient to change the services provided by the devices in the architecture. Therefore, there is a need for a telecommunications architecture that is scaleable and that can be programmed and maintained easily by a service provider. There is a need for such an architecture to provide a myriad of intelligent network services in a cost efficient manner.

SUMMARY OF THE INVENTION

The present invention comprises a system for connecting a call comprising a call processor adapted to receive call information elements and to process the call information elements and call-associated data to select a connection for the call. The call processor transports a control message identifying the selected connection. A signaling interface is adapted to receive the call signaling, to process the call signaling to isolate the call information elements, and to transfer the call information elements to the call processor. A call process control system is adapted to manage the call-associated data and to exchange the call-associated data with the call processor. An interworking unit is adapted to receive the control message from the call processor, to receive user communications, and to interwork the user communications to the selected connection according to the control message.

The present invention further comprises a system for connecting a call comprising a call processor adapted to receive call information elements and to process the call information elements and call-associated data to select a connection for the call. The call processor transports a control message identifying the selected connection. A signaling interface is adapted to receive the call signaling, to process the call signaling to isolate the call information elements and to transfer the call information elements to the call processor. A call process control system is adapted to manage the call-associated data and to exchange the call-associated data with the call processor.

The present invention further comprises a method for connecting a call through an asynchronous transfer mode system comprising receiving call-associated data and managing the call-associated data to be used for processing information parameters to select a connection. The call-associated data is moved to a data structure in a call processor. The call signaling is received and processed to the isolate information parameters in the call signaling. The information parameters are moved from the call process control system to the call processor. The information parameters are processed in the call processor using the call-associated data to select a connection for the call and transported a control message identifying the selected connection.

BRIEF DESCRIPTION OF THE DRAWINGS

FIG. 1 is a block diagram of an architecture for connecting calls in accordance with one embodiment of the present invention.

FIG. 2 is a block diagram of an architecture for connecting calls with a plurality of call processors and with redundancy in accordance with one embodiment of the present invention.

FIG. 6 is a table diagram of a trunk circuit table used in the call processor of FIG. 3.

FIG. 7 is a table diagram of a trunk group table used in the call processor of FIG. 3.

FIG. 8 is a table diagram of an exception circuit table used in the call processor of FIG. 3.

FIG. 9 is a table diagram of an automated number index table used in the call processor of FIG. 3.

FIG. 10 is a table diagram of a called number screening table used in the call processor of FIG. 3.

FIG. 11 is a table diagram of a local routing number table used in the call processor of FIG. 3.

FIG. 12 is a table diagram of a called number table used in the call processor of FIG. 3.

FIG. 13 is a table diagram of a routing table used in the call processor of FIG. 3.

FIG. 14 is a table diagram of a treatment table used in the call processor of FIG. 3.

FIG. 15 is a table diagram of a message table used in the call processor of FIG. 3.

DETAILED DESCRIPTION

Figure 3:
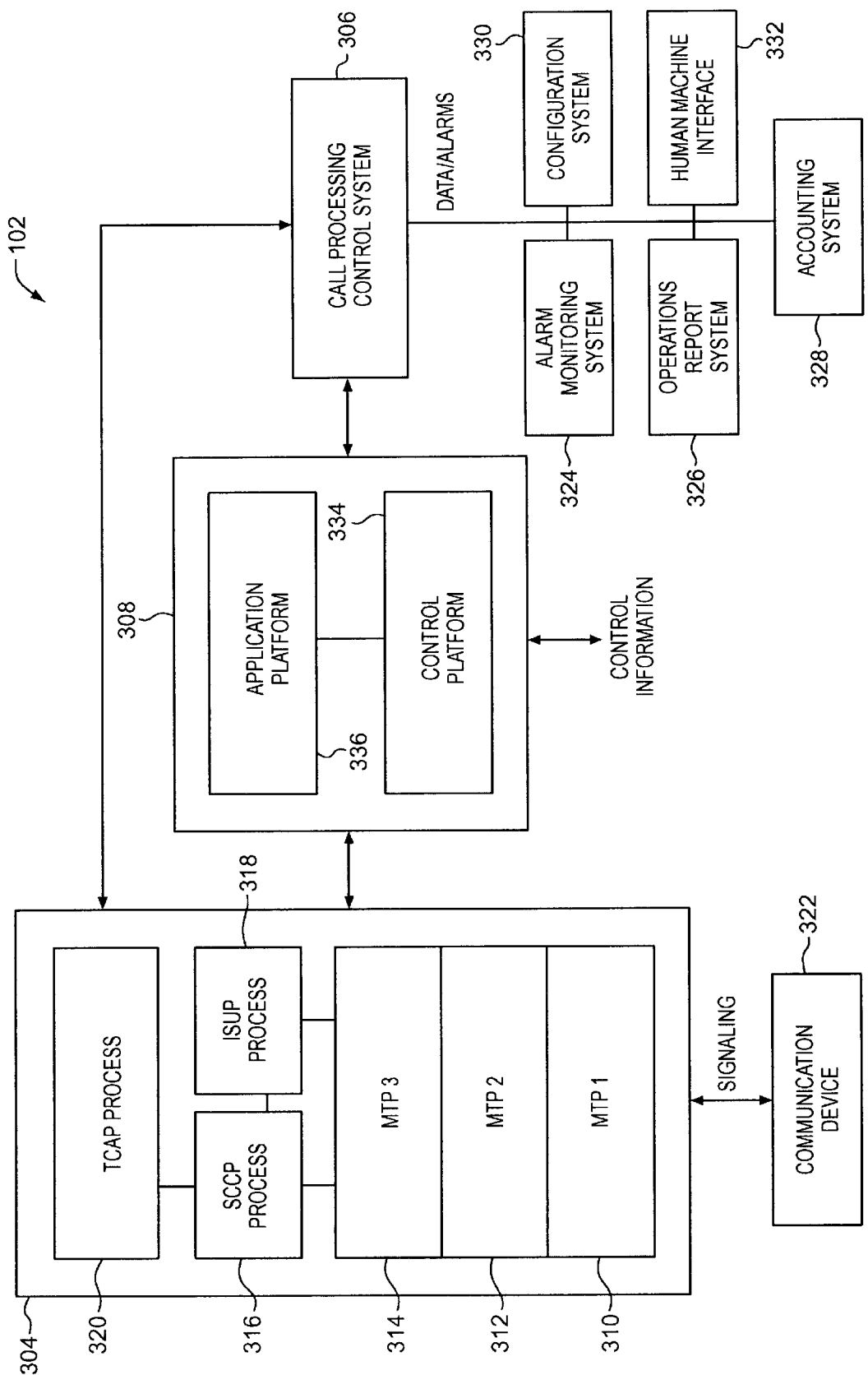
FIG. 3 is a block diagram of the architecture of FIG. 1 interfacing with systems in accordance with an embodiment of the present invention.

Telecommunication systems have a number of communication devices in local exchange and interexchange environments that interact to provide call services to customers. Both traditional and intelligent network (IN) services and resources are used to process, route, or connect a call to a designated connection.

A call has user communications and call signaling. The user communications contain the caller's information, such as a voice communication or data communication, which is transported over a connection. Call signaling contains information that facilitates call processing, and it is communicated over a link. Call signaling contains, for example, information describing the called number and the calling number. Examples of call signaling are standardized signaling, such as signaling system #7 (SS7), C7, integrated services digital network (ISDN), and digital private network signaling system (DPNSS), which are based on ITU recommendation Q.933. A call can be connected to and from communication devices.

The present invention provides a telecommunications architecture for connecting calls in and between local exchange systems and interexchange systems. The telecommunications architecture provides IN call processing and is scaleable so that it can be applied in small and large systems.

FIG. 1 illustrates an architecture system 102 according to the present invention. Architecture system 102 comprises a call processor 104, a signaling interface 106, a call process control system (CPCS) 108, and an interworking unit 110. Architecture system 102 is connected to first communication device 112 and second communication device 114. CPCS 108 is connected to operations systems 116.

It will be appreciated that the elements of the architecture system 102 may be logical or physical entities. In addition, other elements may be connected to the architecture system, but are not shown for clarity. For example, signaling interface 106 may be linked to a signal transfer point (STP) or a service control point (SCP).

Call processor 104 is linked to CPCS 108 by link 118, to signaling interface 106 by link 120, and to interworking unit 110 by link 122. CPCS 108 is linked to signaling interface 106 by link 124, to interworking unit 110 by link 126, and to operations systems 116 by link 128. Link 130 extends between signaling interface 106 and first communications device 112. Another link 132 extends from signaling interface 106. In some cases, link 132 extends to second communication device 114. Interworking unit 110 is connected to first communication device 112 by connection 134 and to second communication device 114 by connection 136.

Links are used to transport call signaling and control messages. The term "link" as used herein means a transmission media that may be used to carry call signaling and control messages containing, for example, device instructions and data. A link can carry, for example, out-of-band signaling such as that used in SS7, C7, ISDN, DPNSS, BISDN, GR-303, via local area network (LAN), or data bus call signaling. A link can be, for example, an AAL5 data link, FDDI, ethernet, DS0, or DS1. In addition, a link, as shown in the figures, can represent a single physical link or multiple links, such as one link or a combination of links of ISDN, SS7, TCP/IP, or some other data link. The term "control message" as used herein means a control or signaling message, a control or signaling instruction, or a control or signaling signal, whether proprietary or standardized, that conveys information from one point to another.

Connections are used to transport user communications and other device information between communication devices and between elements and devices of architecture system 102. The term "connection" as used herein means transmission media that may be used to carry user communications between elements of architecture system 102 and to other devices. For example, a connection could carry a user's voice, computer data, or other communication device data. A connection can be associated with either in-band communications or out-of-band communications.

Call processor 104 includes a signaling platform that can receive and process call signaling. Call processor 104 has data tables which have call connection data and which are used to process the call signaling. Based on the processed call signaling, call processor 104 selects processing options, services, or resources for the user communications and generates and transmits control messages that identify the communication device, processing option, service, or resource that is to be used. Call processor 104 also selects virtual connections and circuit-based connections for call routing and generates and transports control messages that identify the selected connections.

Signaling interface 106 receives, processes, and transmits call signaling. Signaling interface 106 can obtain information from, and transmit information to, a communication device. Such information may be transferred, for example, as a transaction capabilities application part (TCAP) message in queries or responses. Signaling interface 106 also passes information to call processor 104 for processing and passes information from call processor 104 to other communication devices (not shown).

CPCS 108 is a management and administration system. CPCS 108 includes a user interface and an external systems interface into call processor 104. CPCS 108 serves as a collection point for call-associated data such as translations having call routing data, logs, operational measurement data, alarms, statistical information, accounting information, and other call data. CPCS 108 accepts data, such as the translations, from operations systems 116 and updates the data in the tables in call processor 104. CPCS 108 also provides configuration data to various elements of the architecture system 102 including call processor 104, signaling interface 106, and interworking unit 110. In addition, CPCS 108 provides for remote control of call monitoring and call tapping applications from call processor 104.

Interworking unit 110 interworks traffic between various protocols. Preferably, interworking unit 110 interworks between asynchronous transfer mode (ATM) traffic and non-ATM traffic. Interworking unit 110 operates in accordance with control messages received from call processor 104 over link 122. These control messages typically are provided on a call-by-call basis and typically identify an assignment between a DS0 and a VP/VC for which user communications are interworked. In some instances, interworking unit 110 may transport control messages which may include data.

Communication devices 112 and 114 may include customer premises equipment (CPE), a service platform, a switch, an exchange carrier, a remote digital terminal, an ATM device, or any other device capable of initiating, handling, or terminating a call. CPE may include, for example, a telephone, a computer, a facsimile machine, or a private branch exchange. A service platform can be, for example, any enhanced computer platform that is capable of processing calls. A remote digital terminal is a device that concentrates analog twisted pairs from telephones and other like devices and converts the analog signals to a digital format known as GR-303.

Operations systems 116 transports translations and other call-associated data to CPCS 108. In addition, operations systems 116 accepts call-associated data from CPCS 108. Operations systems 116 may include, for example, an alarm monitoring system that receives alarm data, an operations report system to receive trending data, an accounting system to receive accounting data, or a configuration system to transport routing translations or element configuration data to CPCS 108. Operations systems 116 may comprise other elements.

The system of FIG. 1 operates as follows. Translations and other data are transported to CPCS 108 from operations systems 116 over link 128. In addition, CPCS 108 transports data to operations systems 116 over link 128, if required.

CPCS 108 processes the data and organizes the data into tables that are identical to call processing tables located in call processor 104. Then, CPCS 108 data fills the call processing tables in call processor 104 over link 116. In addition, CPCS 108 transports data to any device or entity to which it is configured to transport the data. This data fill may be completed at any time, and updates may be transported from CPCS 108 to call processor 104.

If any configuration of call processor 104, signaling interface 106, or interworking unit 110 is required by CPCS 108, that configuration information is transported to the appropriate element. In addition, alarms from call processor 104, signaling interface 106, or interworking unit 110 are transported to CPCS 108.

First communication device 112 transports call signaling to signaling interface 106 over link 130. First communication device 112 transports the user communications to interworking unit 110 over connection 134.

Signaling interface 106 receives the call signaling and processes the call signaling. Signaling interface 106 passes call information elements received from the call signaling to call processor 104 over link 120.

Call processor 104 processes the call information elements to select a connection 136. The selected connection 136 is preferably a VP/VC. However, it will be appreciated that the selected connection also may be a DS0 or other time-division multiplex (TDM) connection. Call processor 104 sends a first control message to interworking unit 110 over link 122 identifying the selected connection 136 over which user communications will be transported. Call processor 104 also sends a second control message to signaling interface 106 over link 120 destined for another communication device identifying the selected connection 136 over which user communications are to be interworked. The other communication device may be, for example, another call processor or a switch which may handle call signaling.

Signaling interface 106 receives the second control message and processes the control message to place it into a transportable form. In some instances, the control message is converted to an SS7 message. Signaling interface 106 transports the second control message over link 132.

Interworking unit 110 receives user communications from first communication device 112 over connection 134 and the first control message from call processor 104 over link 122. Interworking unit 110 interworks the user communications between a TDM format and an ATM format according to the first control message. Therefore, interworking unit 110 converts user communications from TDM user communications to ATM cells that identify selected connection 136 and transports the ATM cells over the selected connection 136 to second communication device 114.

FIG. 2 illustrates an embodiment of an architecture system 202 according to the present invention that includes redundant elements. Redundant elements may be used to maintain call processing capability in the event a main element is defective or otherwise out of service and cannot complete its functions. Architecture system 202 may have N+1 protection.

FIG. 2 illustrates an architecture system 202 comprising a first main call processor 204, a first backup call processor 204A, a first main signaling interface 206, a first backup signaling interface 206A, a main CPCS 208, a backup CPCS 208A, a first main interworking unit 210, a first backup interworking unit 210A, a second main call processor 212, a second backup call processor 212A, a second main signaling interface 214, a second backup signaling interface 214A, a second main interworking unit 216, and a second backup interworking unit 216A. Architecture system 202 is connected to first communication device 218 and second communication device 220. The elements of architecture system 202 are the same as the elements of architecture system 102 of FIG. 1, and they are linked and connected as described in the text associated with FIG. 1. However, the links and connections are not referenced with a reference number for clarity.

Thus, for example, first backup call processor 204A has the same call processing capability, data tables, data structures, and data as first main call processor 204. If first main call processor 204 is unable to process the call information elements to select connections and to complete other processing, because the first main call processor is defective or otherwise is not operating correctly, then first backup call processor 204A may take over call processing without an interruption of service. Signaling interfaces 206, 206A, 214, and 214A, CPCSs 208 and 208A, interworking units 210, 210A, 216, and 216A, and second call processors 212 and 212A also have this redundant structure for their respective operations.

FIG. 3 more fully illustrates the architecture system 102 illustrated in FIG. 1. Other versions also are contemplated. In the embodiment depicted in FIG. 3, architecture system 102 includes a signaling interface 304, a CPCS 306, and a call processor 308. It will be appreciated that the elements of architecture system 102 may be constructed as modules in a single unit or as multiple units.

Signaling interface 304 is coupled externally to signaling systems—in particular to signaling systems having a message transfer part (MTP), an ISDN user part (ISUP), a signaling connection control part (SCCP), an intelligent network application part (INAP) and a TCAP. Signaling interface 304 preferably is a platform that comprises an MTP level 1 310, an MTP level 2 312, and MTP level 3 314, an SCCP process 316, an ISUP process 318, and a TCAP process 320. Signaling interface 304 also has INAP functionality (not shown). Signaling interface 304 may be linked to a communication device 322. For example, communication device 322 may be an SCP which is queried by the signaling interface with an AIN 0.1 SCP TCAP query to obtain additional call-associated data. The answer message may have additional information parameters that are required to complete call processing. Communication device 322 also may be an STP or other device.

Signaling interface 304 is operational to transmit, process, and receive call signaling. The TCAP, SCCP, ISUP, and INAP functionality use the services of MTP to transmit and receive the messages. Preferably, signaling interface 304 transmits and receives SS7 messages for MTP, TCAP, SCCP, and ISUP. Together, this functionality is referred to as an "SS7 stack," and it is well known. The software required by one skilled in the art to configure an SS7 stack is commercially available. One example is the OMNI SS7 stack from Dale, Gesek, McWilliams & Sheridan, Inc. (the DGM&S company).

The processes of the signaling interface 304 process information that is received in message signal units (MSUs) and convert the information to call information elements that are sent to call processor 308 to be processed. A call information element may be, for example, an ISUP IAM message parameter from the MSU. Signaling interface 304 strips the unneeded header information from the MSU to isolate the message information parameters and passes the parameters to call processor 308 as the call information elements. Examples of these parameters are the called number, calling number, and user service information. Other examples of messages with information elements are an ANM, an ACM, an REL, an RLC, and an INF. In addition, call information elements are transferred from call processor 308 back to signaling interface 304, and the information elements are reassembled into MSUs and transferred to a signaling point.

CPCS 306 comprises several data structures and interfaces. For example, CPCS 306 may comprise interfaces and structures to and for an operations system having an alarm monitoring system 324, an operations report system 326, an accounting system 328, and a configuration system 330. CPCS 306 also may have a human-machine interface (HMI) 332. Typically, the messages and data are sent to CPCS 306 through signaling interface 304, through HMI 332, or through the interfaces to the operations system. However, other methods and devices may be used.

CPCS 306 has data tables which have call connection data. CPCS 306 accepts data from configuration systems 330 and updates the data in the CPCS tables. The data from configuration systems 330 may include routing data, such as translations for the data fill in the call processing tables, and equipment configuration data. The data in the call processing tables is used to data fill similar tables in call processor 308. CPCS 306 receives the data and may process the data to make sure it is in the correct format prior to filling the tables in call processor 308. CPCS 306 maintains a current, historical, and prospective perspective of the tables that are located in call processor 308.

CPCS 306 also serves as a collection point for alarms. Alarm information is transferred to CPCS 306. CPCS 306 then transports alarm messages to the required communication device or alarm monitoring system 324. For example, CPCS 306 can transport alarms to an operations center.

HMI 332 allows a person to log onto CPCS 306 and to manage data tables or to review data tables in CPCS 306 or to provide maintenance services. Thus, HMI 332 allows access to CPCS 306 for active call processing and passive call processing.

Call processor 308 processes call signaling and controls an ATM interworking unit, such as an ATM interworking multiplexer (mux) that performs interworking of DS0s and VP/VCs. However, call processor 308 may control other communications devices and connections in other embodiments.

Call processor 308 receives and processes telecommunications call signaling, control messages, and customer data to select connections that establish communication paths for calls. In the preferred embodiment, the call processor processes SS7 signaling to select connections for a call. Call processing in the call processor and the associated maintenance that is performed for call processing is described in a U.S. Patent Application entitled "System and Method for Treating a Call for Call Processing" filed on the same date as this application, which is assigned to the same assignee as this patent application, and which is incorporated herein by reference.

In addition to selecting connections, call processor 308 performs many other functions in the context of call processing. It not only can control routing and select the actual connections, but it also can validate callers, control echo cancelers, generate accounting information, invoke intelligent network functions, access remote databases, manage traffic, and balance network loads. One skilled in the art will appreciate how the call processor described below can be adapted to operate in the above embodiments.

Call processor 308 comprises a control platform 334 and an application platform 336. Each platform 334 and 336 is coupled to the other platform.

Control platform 334 is comprised of various external interfaces including an interworking unit interface, an echo interface, a resource control interface, a call information interface and an operations interface. Control platform 334 is externally coupled to an interworking unit control, an echo control, a resource control, accounting, and operations. The interworking unit interface exchanges messages with at least one interworking unit. These messages comprise DS0 to VP/VC assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The call information interface transfers pertinent call information to a call information processing system, such as to CPCS 306. Typical call information includes various accounting information, such as the parties to the call, time points for the call, and any special features applied to the call. One skilled in the art will appreciate how to produce the software for the interfaces in control platform 334.

Application platform 336 processes signaling information from signaling interface 304 to select connections. The identity of the selected connections are provided to control platform 334 for the interworking unit interface. Application platform 336 is responsible for validation, translation, routing, call control, exceptions, screening, and error handling. In addition to providing the control requirements for the interworking unit, application platform 336 also provides requirements for echo control and resource control to the appropriate interface of the control platform 334. In addition, application platform 336 generates signaling information for transmission by signaling interface 304. The signaling information might be for ISUP, INAP, or TCAP messages to external network elements. Pertinent information for each call is stored in a call buffer information (CBI) location for the call. The CBI can be used for tracking and accounting the call.

Application platform 336 operates in general accord with the Basic Call Model (BCM) defined by the ITU. An instance of the BCM is created to handle each call. The BCM includes an originating process and a terminating process. Application platform 336 includes a service switching function (SSF) that is used to invoke the service control function (SCF). Typically, the SCF is contained in an SCP. The SCF is queried with TCAP or INAP messages transported by signaling interface 304 which are initiated with information from the SSF in application platform 336. The originating or terminating processes will access remote databases with intelligent network (IN) functionality via the SSF.

Software requirements for application platform 336 can be produced in specification and description language (SDL) defined in ITU-T Z.100. The SDL can be converted into C code. A real time case tool such as SDT from Telelogic, Inc. or Object Time from Object Time, Inc. can be used. Additional C and C++ code can be added as required to establish the environment.

Call processor 308 may include the above-described software loaded onto a computer. The computer may be a Tandem S4000 using the non-stop Unix operating system and conventional database systems. It may be desirable to utilize the multi-threading capability of a Unix operating system.

From FIG. 3, it can be seen that application platform 336 processes signaling information to control numerous systems and facilitate call connections and services. SS7 signaling is exchanged between call processor 308 and external components through signaling interface 304, and control information is exchanged with external systems through control platform 334. Advantageously, signaling interface 304, CPCS 306, and call processor 308 are not integrated into a switch central processing unit (CPU) that is coupled to a switching matrix. Unlike an SCP, the components of signaling processor 302 are capable of processing ISUP messages independently of TCAP queries.

SS7 Message Designations

SS7 messages are well known. Designations for various SS7 messages commonly are used. Those skilled in the art are familiar with the following message designations:

ACM—Address Complete Message
ANM—Answer Message
BLO—Blocking
BLA—Blocking Acknowledgment
CPG—Call Progress
CRG—Charge Information
CGB—Circuit Group Blocking
CGBA—Circuit Group Blocking Acknowledgment
GRS—Circuit Group Reset
GRA—Circuit Group Reset Acknowledgment
CGU—Circuit Group Unblocking
CGUA—Circuit Group Unblocking Acknowledgment
CQM—Circuit Group Query
CQR—Circuit Group Query Response
CRM—Circuit Reservation Message
CRA—Circuit Reservation Acknowledgment
CVT—Circuit Validation Test
CVR—Circuit Validation Response
CFN—Confusion
COT—Continuity
CCR—Continuity Check Request
EXM—Exit Message
INF—Information
INR—Information Request
IAM—Initial Address
LPA—Loop Back Acknowledgment
PAM—Pass Along
REL—Release
RLC—Release Complete
RSC—Reset Circuit
RES—Resume
SUS—Suspend
TCAP—Transaction Capabilities Application Part
UBL—Unblocking
UBA—Unblocking Acknowledgment
UCIC—Unequipped Circuit Identification Code.

Call Processor Tables

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 4:
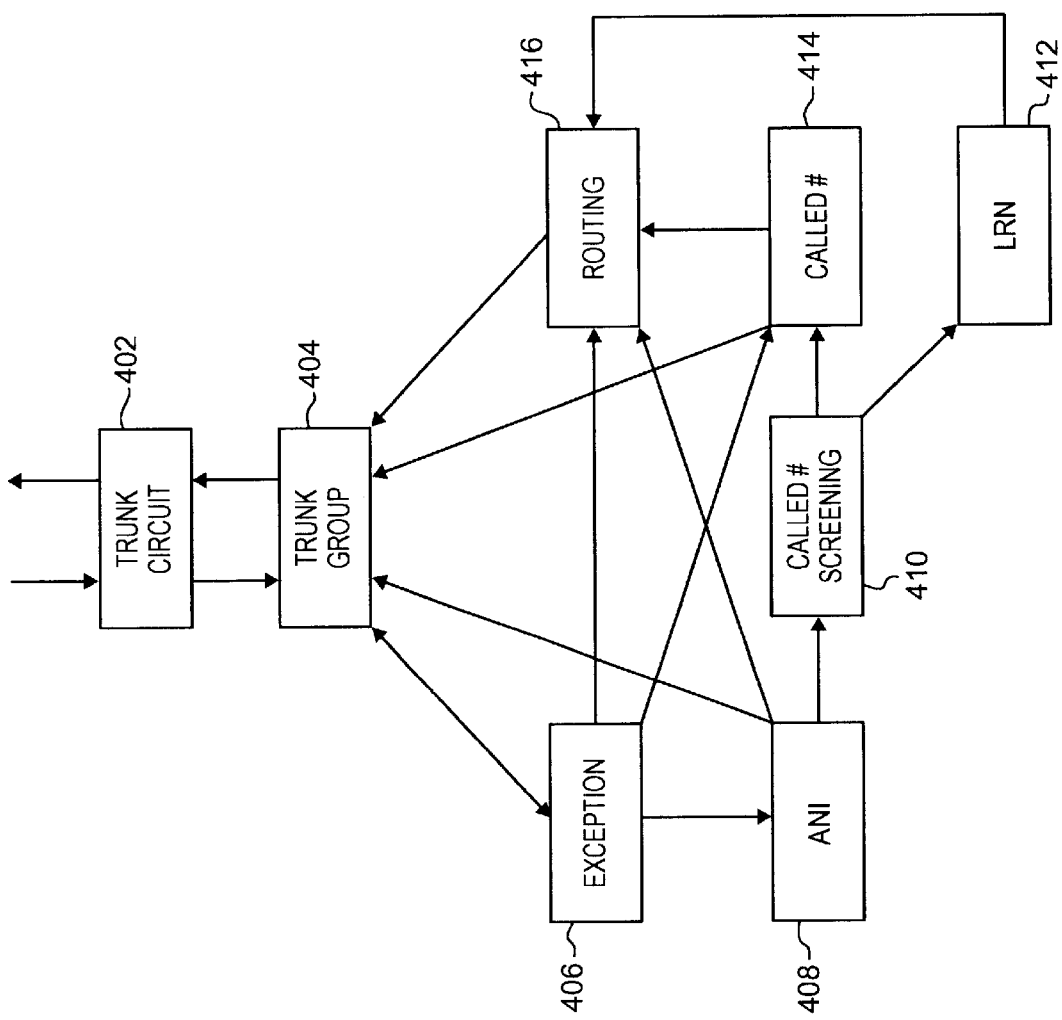
FIG. 4 is a block diagram of a data structure having tables that are used in the call processor of FIG. 3.

FIG. 4 depicts a data structure used by application platform 336 of FIG. 3 to execute the BCM. This is accomplished through a series of tables that point to one another in various ways. The pointers are typically comprised of next function and next index designations. The next function points to the next table, and the next index points to an entry or a range of entries in that table. The data structure has trunk circuit table 402, trunk group table 404, exception table 406, ANI table 408, called number screening table 410, location routing number (LRN) table 412, called number table 414, and routing table 416.

Trunk circuit table 402 contains information related to the connections. Typically, the connections are DS0 or ATM connections. Initially, trunk circuit table 402 is used to retrieve information about the originating connection. Later, the table is used to retrieve information about the terminating connection. When the originating connection is being processed, the trunk group number in trunk circuit table 402 points to the applicable trunk group for the originating connection in trunk group table 404.

Trunk group table 404 contains information related to the originating and terminating trunk groups. When the originating connection is being processed, trunk group table 404 provides information relevant to the trunk group for the originating connection and typically points to exception table 406.

Exception table 406 is used to identify various exception conditions related to the call that may influence the routing or other handling of the call. Typically, exception table 406 points to ANI table 408. Although, exception table 406 may point directly to trunk group table 404, called number table 414, or routing table 416.

ANI table 408 is used to identify any special characteristics related to the caller's number. The caller's number is commonly known as automatic number identification (ANI). ANI table 408 typically points to called number screening table 410. Although, ANI table 408 may point directly to trunk group table 404 or routing table 416.

Called number screening table 410 is used to provide the trigger detection point (TDP) for an AIN 0.1 SCP TCAP query. It is used, for example, with the local number portability (LNP) feature. Called number screening table 410 invokes a TCAP. According to the TCAP response, either LRN table 412 or called number table 414 is accessed.

LRN table 412 is used to identify routing requirements based on the called number for those calls that have a return response from an LNP query to an SCP, indicating that the called number is ported. LRN table 412 points to routing table 416.

Called number table 414 is used to identify routing requirements based on the called number. This will be the case for standard telephone calls. Called number table 414 typically points to routing table 416. Although, it may point to trunk group table 404.

Routing table 416 has information relating to the routing of the call for the various connections. Routing table 416 is entered from a pointer in the exception table 406, ANI table 408, LRN table 412, or called number table 414. Routing table 416 typically points to a trunk group in trunk group table 404.

When exception table 406, ANI table 408, called number table 414, or routing table 416 point to trunk group table 404, they effectively select the terminating trunk group. When the terminating connection is being processed, the trunk group number in trunk group table 404 and trunk circuit table 406 is the index that points to the trunk group index. The trunk group index contains the applicable terminating connection in trunk circuit table 404.

The terminating trunk circuit is used to extend the call. The trunk circuit is typically a VP/VC or a DS0. Thus, it can be seen that by migrating through the tables, a terminating connection can be selected for a call.

Figure 5:
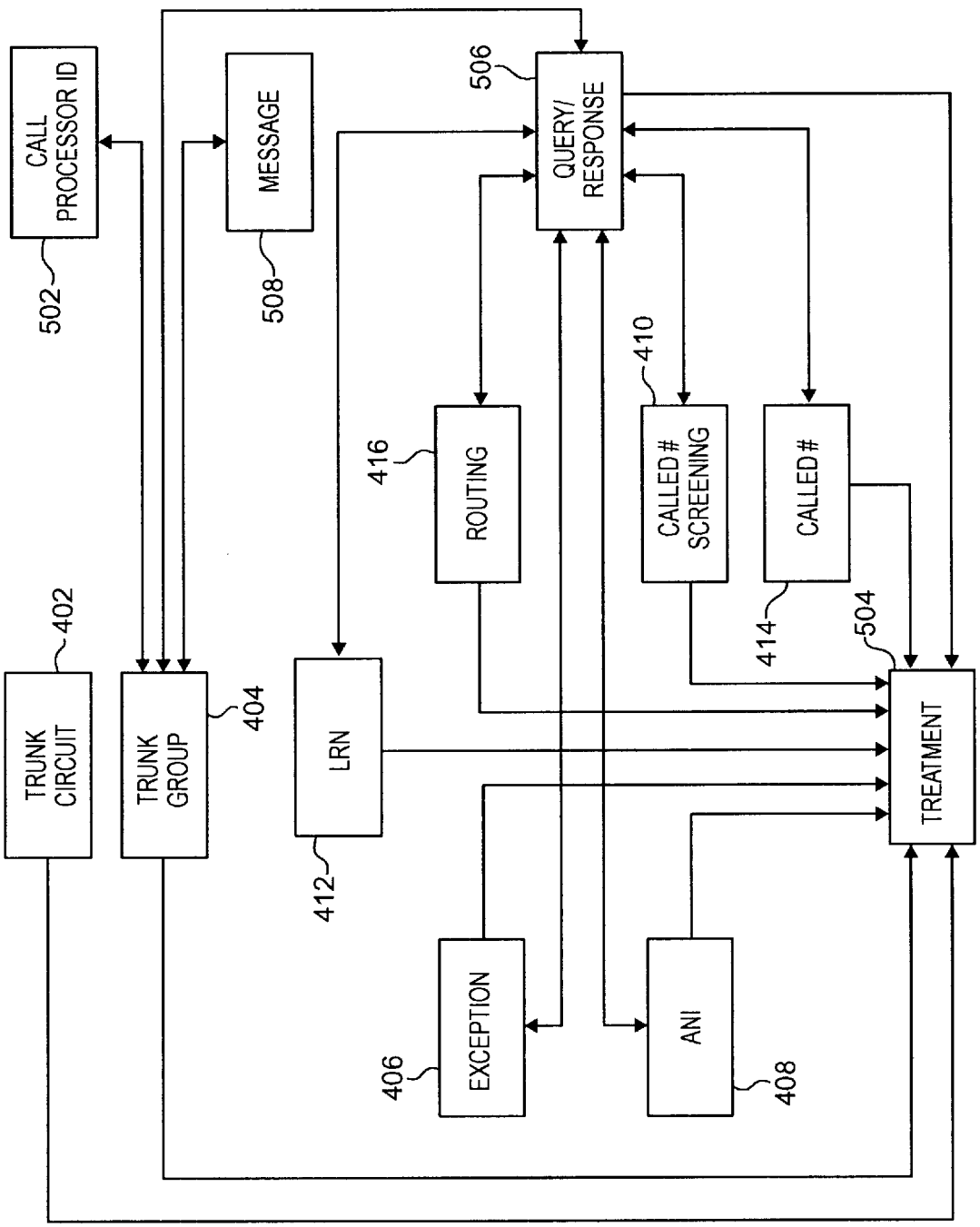
FIG. 5 is a block diagram of additional tables that are used in the call processor of FIG. 3.

FIG. 5 is an overlay of FIG. 4. The tables from FIG. 4 are present, but for clarity, their pointers have been omitted. FIG. 5 illustrates additional tables that can be accessed from the tables of FIG. 4. These include a call processor ID table 502, a treatment table 504, a query/response table 506, and a message table 508.

Call processor ID table 502 contains various call processor SS7 point codes. It can be accessed from trunk group table 404, and it points back to trunk group table 404.

Treatment table 504 identifies various special actions to be taken in the course of call processing. This will typically result in the transmission of a release message (REL) and a cause value. Treatment table 504 can be accessed from trunk circuit table 402, trunk group table 404, exception table 406, ANI table 408, called number screening table 410, LRN table 412, called number table 414, routing table 416, and query/response table 506.

Query/response table 506 has information used to invoke the SCF. It can be accessed by trunk group table 404, exception table 406, ANI table 408, called number screening table 410, LRN table 412, called number table 414, and routing table 416. It points to trunk group table 404, exception table 406, ANI table 408, called number screening table 410, LRN table 412, called number table 414, routing table 416, and treatment table 504.

Message table 508 is used to provide instructions for signaling messages from the termination side of the call. It can be accessed by trunk group table 404 and points to trunk group table 404.

FIGS. 6–15 depict examples of the various tables described above. FIG. 6 depicts an example of the trunk circuit table. Initially, the trunk circuit table is used to access information about the originating circuit. Later in the processing, it is used to provide information about the terminating circuit. For originating circuit processing, the associated point code is used to enter the table. This is the point code of the switch or call processor associated with the originating circuit. For terminating circuit processing, the trunk group number is used to enter the table.

The table also contains the circuit identification code (CIC). The CIC identifies the circuit which is typically a DS0 or a VP/VC. Thus, the invention is capable of mapping the SS7 CICs to the ATM VP/VC. If the circuit is ATM, the VP and the VC also can be used for identification. The group member number is a numeric code that is used for terminating circuit selection. The hardware identifier identifies the location of the hardware associated with the originating circuit. The echo canceler (EC) identification (ID) entry identifies the echo canceler for the originating circuit.

The remaining fields are dynamic in that they are filled during call processing. The echo control entry is filled based on three fields in signaling messages: the echo suppresser indicator in the IAM or circuit reservation message (CRM), and the information transfer capability in the IAM. This information is used to determine if echo control is required on the call. The satellite indicator is filled with the satellite indicator in the IAM or CRM. It may be used to reject a call if too many satellites are used. The circuit status indicates if the given circuit is idle, blocked, or not blocked. The circuit state indicates the current state of the circuit, for example, active or transient. The time/date indicates when the idle circuit went idle.

FIG. 7 depicts an example of a trunk group table. During origination processing, the trunk group number from the trunk circuit table is used to key into the trunk table. Glare resolution indicates how a glare situation is to be resolved. Glare is dual seizure of the same circuit. If the glare resolution entry is set to "even/odd," the network element with the higher point code controls the even circuits, and the network element with the lower point code controls the odd circuits. If the glare resolution entry is set to "all," the call processor controls all of the circuits. If the glare resolution entry is set to "none," the call processor yields. The continuity control entry lists the percent of calls requiring continuity tests on the trunk group.

Continuity control indicates whether continuity is to be checked. The common language location identifier (CLLI) entry is a Bellcore standardized entry. The satellite trunk group entry indicates that the trunk group uses a satellite. The satellite trunk group entry is used in conjunction with the satellite indicator field described above to determine if the call has used too many satellite connections and, therefore, must be rejected. The service indicator indicates if the incoming message is from a call processor (ATM) or a switch (TDM). The outgoing message index (OMI) points to the message table so that outgoing messages can obtain parameters. The associated number plan area (NPA) entry identifies the area code.

Selection sequence (SEL SEQ) indicates the methodology that will be used to select a connection. The selection sequence field designations tell the trunk group to select circuits based on the following: least idle, most idle, ascending, descending, clockwise, and counterclockwise. The hop counter is decremented from the IAM. If the hop counter is zero, the call is released. Automatic congestion control (ACC) active indicates whether or not congestion control is active. If automatic congestion control is active, the call processor may release the call. During termination processing, the next function and index are used to enter the trunk circuit table. Reattempt circuit indicates if an outgoing call can be reattempted on a different circuit within the same trunk group.

Default jurisdiction information parameter (JIP) is an NPA-NXX value that is used to identify the switch from which the call originates. If an ISUP JIP is not received in an IAM, the default JIP is the value recorded on the call processor CBI. Alternately, this field can hold a default LRN having a ten digit form of NPA-NXX-XXXX in which the first six digits can populate the JIP parameter. If an ISUP LRN is not received in an IAM, the default IAM is the value recorded on the call processor CBI. The next function and next index entries point to the next table.

FIG. 8 depicts an example of an exception table. The index is used as a pointer to enter the table. The carrier selection identification (ID) parameter indicates how the caller reached the network and is used for routing certain types of calls. The following are used for this field: spare or no indication, selected carrier identification code presubscribed and input by the calling party, selected carrier identification code presubscribed and not input by the calling party, selected carrier identification code presubscribed and no indication of input by the calling party, and selected carrier identification code not presubscribed and input by the calling party. The carrier identification (ID) indicates the network that the caller wants to use. This is used to route calls directly to the desired network.

The called party number nature of address differentiates between 0+ calls, 1+ calls, test calls, and international calls. For example, international calls might be routed to a preselected international carrier. The called party "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" field is a decimal number ranging from 1–15 digits. It can be any length and, if filled with less than 15 digits, is filled with 9s for the remaining digits. The next function and next index entries point to the next table which is typically the ANI table.

FIG. 9 depicts an example of an ANI table. The index is used to enter the fields of the table. The calling party category differentiates among types of calling parties, for example, test calls, emergency calls, and ordinary calls. The calling party/charge number entry nature of address indicates how the ANI is to be obtained. The following is the table fill that is used in this field: unknown, unique subscriber numbers, ANI not available or not provided, unique national number, ANI of the called party included, ANI of the called party not included, ANI of the called party includes national number, non-unique subscriber number, non-unique national number, non-unique international number, test line test code, and all other parameter values. The "digits from" and "digits to" focus further processing unique to ANI within a given range. The data entry indicates if the ANI represents a data device that does not need echo control. Originating line information (OLI) differentiates among ordinary subscriber, multiparty line, ANI failure, station level rating, special operator handling, automatic identified outward dialing, coin or non-coin call using database access, 800\888 service call, coin, prison/inmate service, intercept (blank, trouble, and regular), operator handled call, outward wide area telecommunications service, telecommunications relay service (TRS), cellular services, private paystation, and access for private virtual network types of service. The next function and next index point to the next table which is typically the called number table.

FIG. 10 depicts an example of a called number screening table. The index is used to enter the table. The nature of address entry indicates the type of dialed number, for example, national versus international. The "digits from" and "digits to" entries focus further processing unique to a range of called numbers. This is where the TCAP response information is incorporated in the call processing flow. This is where the trigger occurs for an LNP TCAP query launch. The processing follows the processing logic of the "digits from" and "digits to" fields in FIG. 8. The next function and next index point to the next table which is typically either the called number table or the LRN table.

FIG. 11 depicts an example of an LRN table. This table will perform the same function as the called number table for those calls that are identified as ported based upon an LNP query response. The index is used to enter the table. The nature of address entry indicates the type of dialed number, for example, national versus international. In an LRN case, the value is a national number. The "digits from" and "digits to" entries focus further processing unique to a range of called numbers. This is where the TCAP response information is incorporated in the call processing flow. The processing follows the processing logic of the "digits from" and "digits to" fields in FIG. 8. The next function and next index point to the next table which is typically the routing table.

FIG. 12 depicts an example of a called number table. The index is used to enter the table. The called number nature of address entry indicates the type of dialed number, for example, national versus international. The "digits from" and "digits to" entries focus further processing unique to a range of called numbers, and they are used in the LRN table check process. The processing follows the processing logic of the "digits from" and "digits to" fields in FIG. 8. The next function and next index point to the next table which is typically the routing table.

FIG. 13 depicts an example of the routing table. The index is used to enter the table. The transit network selection (TNS) network identification (ID) plan indicates the number of digits to use for the CIC. The transit network selection "digits" field defines the numbers to identify an international carrier. The circuit code indicates the need for an operator on the call. The next function, next index, and signal route entries in the routing table are used to identify a trunk group. The second and third next function/index/signal route entries define alternate routes. The third next function entry also can point back to another set of next functions in the routing table in order to expand the number of alternate route choices. The only other entries allowed are pointers to the treatment table. If the routing table points to the trunk group table, then the trunk group table typically points to a trunk circuit in the trunk circuit table. The yield from the trunk circuit table is the terminating connection for the call.

It can be seen from FIGS. 6–13 that the tables can be configured and relate to one another in such a way that call processes can enter the trunk circuit table for the originating connection and can traverse through the tables by keying on information and using pointers. The yield of the tables is typically a terminating connection identified by the trunk circuit table. In some cases, treatment is specified by the treatment table instead of a connection. If, at any point during the processing, a trunk group can be selected, processing may proceed directly to the trunk group table for terminating circuit selection. For example, it may be desirable to route calls from a particular ANI over a particular set of trunk groups. In this case, the ANI table would point directly to the trunk group table, and the trunk group table would point to the trunk circuit table for a terminating circuit. The default path through the tables is: trunk circuit, trunk group, exception, ANI, called number screening, called number, routing, trunk group, and trunk circuit.

FIG. 14 depicts an example of a treatment table. Either the index or the message received cause number are filled and are used to enter the table. If the index is filled and used to enter the table, the general location, coding standard, and cause value indicator are used to generate an SS7 REL. The message received cause value entry is the cause value in a received SS7 message. If the message received cause value is filled and used to enter the table, then the cause value from that message is used in an REL from the call processor. The next function and next index point to the next table.

FIG. 15 depicts an example of a message table. This table allows the call processor to alter information in outgoing messages. Message type is used to enter the table, and it represents the outgoing standard SS7 message type. The parameter is the pertinent parameter within the outgoing SS7 message. The indexes point to various entries in the trunk group table and determine if parameters are passed unchanged, omitted, or modified in the outgoing messages.

The ATM Interworking Unit

Figure 16:
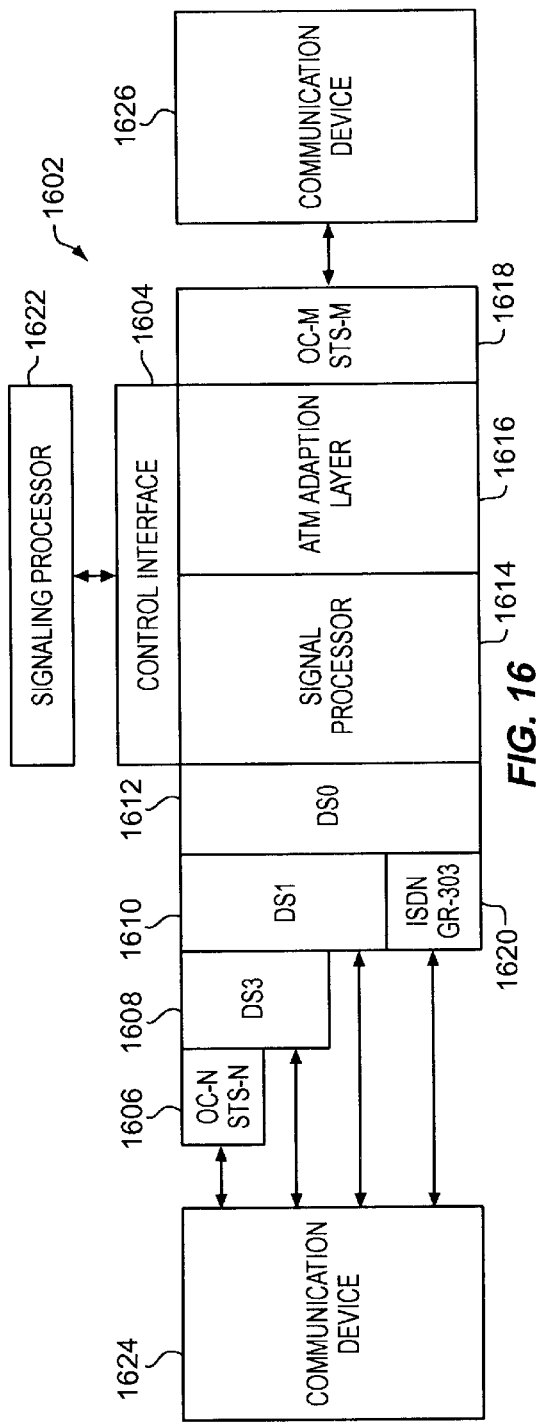
FIG. 16 is a functional diagram of an asynchronous transfer mode interworking unit for use with a synchronous optical network system in accordance with the present invention.

FIG. 16 shows one embodiment of an interworking unit which is an ATM interworking unit 1602 suitable for the present invention for use with a SONET system, but other interworking units that support the requirements of the invention also are applicable. ATM interworking unit 1602 may receive and transmit in-band and out-of-band calls.

ATM interworking unit 1602 has control interface 1604, OC-N/STS-N interface 1606, DS3 interface 1608, DS1 interface 1610, DS0 interface 1612, signal processor 1614, ATM adaptation layer (AAL) 1616, OC-M/STS-M interface 1618, and ISDN/GR-303 interface 1620. As used herein in conjunction with OC or STS, "N" refers to an integer, and "M" refers to an integer.

Control interface 1604 receives control messages originating from signaling processor 1622, identifies DS0 and virtual connection assignments in control messages, and provides these assignments to AAL 1616 for implementation. Control messages are received over an ATM virtual connection and through OC-M/STS-M interface 1618 to control interface 1604 or directly through control interface 1604 from a link.

OC-N/STS-N interface 1606, DS3 interface 1608, DS1 interface 1610, DS0 interface 1612, and ISDN/GR-303 interface 1620 each can receive user communications from communication device 1624. Likewise, OC-M/STS-M interface 1618 can receive user communications from communication device 1626.

OC-N/STS-N interface 1606 receives OC-N formatted user communications and STS-N formatted user communications and converts the user communications to the DS3 format. DS3 interface 1608 receives user communications in the DS3 format and converts the user communications to the DSI format. DS3 interface 1608 can receive DS3s from OC-N/STS-N interface 1606 or from an external connection. DS1 interface; 1610 receives the user communications in the DS1 format and converts the user communications to the DS0 format. DS1 interface 1610 receives DS1s from DS3 interface 1608 or from an external connection. DS0 interface 1612 receives user communications in the DS0 format and provides an interface to AAL 1616. ISDN/GR.303 interface 1620 receives user communications in either the ISDN format or the GR.303 format and converts the user communications to the DS0 format. In addition, each interface may transmit user communications in like manner to communication device 1624.

OC-M/STS-M interface 1618 is operational to receive ATM cells from AAL 1616 and to transmit ATM cells over the connection to communication device 1626. OC-M/STS-M interface 1618 also may receive ATM cells in the OC format or the STS format and transmit them to AAL 1616.

AAL 1616 comprises a convergence sublayer and a segmentation and reassembly (SAR) sublayer. AAL 1616 obtains the identity of the DS0 and the ATM VP/VC from control interface 1604. AAL 1616 is operational to convert between the DS0 format and the ATM format. AALs are well known in the art; information about AALs is provided by International Telecommunications Union (ITU) document I.363, which is incorporated herein by reference. An AAL for voice calls is described in U.S. Pat. No. 5,606,553 entitled "Cell Processing for Voice Transmission" which is incorporated herein by reference.

Calls with multiple 64 Kilo-bits per second (Kbps) DS0s are known as N×64 calls. If desired, AAL 1616 can be configured to accept control messages through control interface 1604 for N×64 calls. ATM interworking unit 1602 is able to interwork, multiplex, and demultiplex for multiple DS0s. Techniques for processing VP/VCs are disclosed in commonly assigned U.S. patent application Ser. No. 08/653, 852, filed on May 28, 1996, and entitled "Telecommunications System with a Connection Processing System," and which is incorporated herein by reference.

DS0 connections are bidirectional, and ATM connections are typically uni-directional. Therefore, two virtual ATM connections in opposing directions typically will be required for each DS0. Those skilled in the art will appreciate how this can be accomplished in the context of the invention. For example, the cross-connect can be provisioned with a second set of VP/VCs in the opposite direction as the original set of VP/VCs.

In some embodiments, it may be desirable to incorporate digital signal processing capabilities at the DS0 level. It may also be desired to apply echo cancellation to selected DS0 circuits. In these embodiments, signal processor 1614 is included either separately (as shown) or as a part of DS0 interface 1612. Signaling processor 1622 is configured to send control messages to ATM interworking unit 1602 to implement particular features on particular DS0 circuits. Alternatively, lookup tables may be used to implement particular features for particular circuits or VP/VCs.

Figure 17:
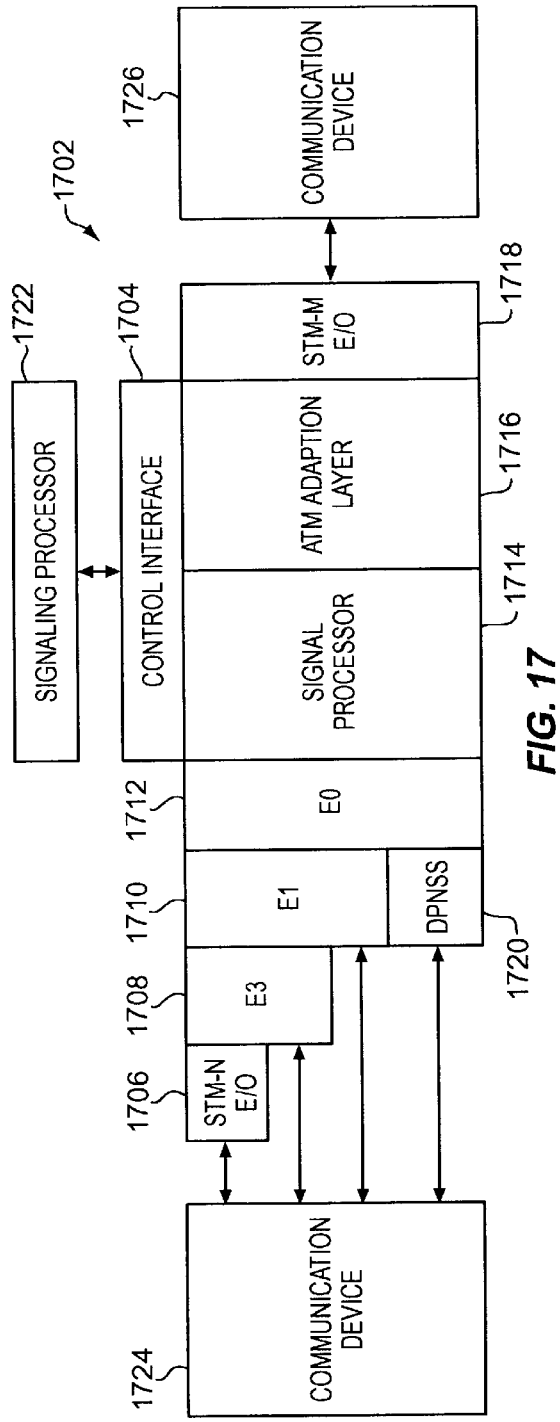
FIG. 17 is a functional diagram of an asynchronous transfer mode interworking unit for use with a synchronous digital hierarchy system in accordance with the present invention.

FIG. 17 shows another embodiment of an interworking unit which is an ATM interworking unit 1702 suitable for the present invention for use with an SDH system. ATM interworking unit 1702 has control interface 1704, STM-N electrical/optical (E/O) interface 1706, E3 interface 1708, E1 interface 1710, E0 interface 1712, signal processor 1714, AAL 1716, STM-M electrical/optical (E/O) interface 1718, and digital private network signaling system (DPNSS) interface 1720. As used herein in conjunction with STM, "N" refers to an integer, and "M" refers to an integer.

Control interface 1704 receives control messages from the signaling processor 1722, identifies E0 and virtual connection assignments in the control messages, and provides these assignments to AAL 1716 for implementation. The control messages are received over an ATM virtual connection and through STM-M interface 1718 to control interface 1604 or directly through control interface 1604 from a link.

STM-N E/O interface 1706, E3 interface 1708, E1 interface 1710, E0 interface 1712, and DPNSS interface 1720 each can receive user communications from second communication device 1724. Likewise, STM-M E/O interface 1718 can receive user communications from third communication device 1726.

STM-N E/O interface 1706 receives STM-N electrical or optical formatted user communications and converts the user communications from STM-N electrical or STM-N optical format to E3 format. E3 interface 1708 receives user communications in the E3 format and converts the user communications to the E1 format. E3 interface 1708 can receive E3s from STM-N E/O interface 1706 or from an external connection. E1 interface 1710 receives user communications in the E1 format and converts the user communications to the E0 format. E1 interface 1710 receives E1s from STM-N E/O interface 1706 or E3 interface 1708 or from an external connection. E0 interface 1712 receives user communications in the E0 format-and provides an interface to AAL 1716. DPNSS interface 1720 receives user communications in the DPNSS format and converts the user communications to the E0 format. In addition, each interface may transmit user communications in a like manner to communication device 1724.

STM-M E/O interface 1718 is operational to receive ATM cells from AAL 1716 and to transmit ATM cells over the connection to communication device 1726. STM-M E/O interface 1718 may also receive ATM cells in the STM-M E/O format and transmit them to AAL 1716.

AAL 1716 comprises both a convergence sublayer and a segmentation and reassembly (SAR) sublayer. AAL 1716 obtains the identity of the E0 and the ATM VP/VC from, control interface 1704. AAL 1716 is operational to convert between the E0 format and the ATM format, either in response to a control instruction or without a control instruction. AAL's are well known in the art. If desired, AAL 1716 can be configured to receive control messages through control interface 1704 for N×64 user communications.

E0 connections are bidirectional and ATM connections typically are unidirectional. As a result, two virtual connections in opposing directions typically will be required for each E0. As described above, those skilled in the art will appreciate how this can be accomplished in the context of the invention.

In some instances, it may be desirable to incorporate digital signal processing capabilities at the E0 level. Also, it may be desirable to apply echo cancellation. In these embodiments, signal processor 1714 is included either separately (as shown) or as a part of E0 interface 1712. Signaling processor 1722 is configured to send control messages to ATM interworking unit 1702 to implement particular features on particular circuits. Alternatively, lookup tables may be used to implement particular features for particular circuits or VP/VCs.

Those skilled in the art will appreciate that variations from the specific embodiments disclosed above are contemplated by the invention. The invention should not be restricted to the above embodiments, but should be measured by the following claims.

What is claimed is:

1. A communication system comprising:

a control system including control system data tables and configured to receive and process call routing data to fill the control system data tables with the call routing data, and to transfer the call routing data from the control system data tables to call processor data tables;

a call processor including the call processor data tables and configured to process signaling information for a call based on the call routing data in the call processor data tables to transfer a control message for the call indicating a first connection and a second connection; and an interworking unit configured to receive the control message, and in response to the control message, receive user communications in a first format from a first connection, convert the user communications to a second format, and transfer the user communications in the second format over the second connection.

2. The communication system of claim 1 wherein the control system is configured to maintain the control system data tables to format the call routing data for the call processor data tables.

3. The communication system of claim 1 wherein the control system data tables and the call processor data tables are identical.

4. The communication system of claim 1 wherein the control system includes a user interface configured to allow a user to view the control system data tables.

5. The communication system of claim 1 wherein the control system is further configured to transfer the call routing data from the control system data tables to redundant data tables, and further comprising a redundant processor including the redundant data tables and configured to process the signaling information for the call based on the call routing data in the redundant data tables to transfer the control message for the call.

6. The communication system of claim 1 wherein the control system data tables and the call processor data tables each include a called number table.

7. The communication system of claim 1 wherein the call processor is configured to transfer accounting information for the call to the control system.

8. The communication system of claim 1 wherein the call processor is configured to transfer alarm information to the control system.

9. The communication system of claim 1 wherein the first connection comprises a DS0 connection.

10. The communication system of claim 1 wherein the second connection comprises a virtual connection.

11. A method of operating a communication system comprising:

in a control system including control system data tables, receiving and processing call routing data to fill the control system data tables with the call routing data, and transferring the call routing data from the control system data tables to call processor data tables;

in a call processor including the call processor data tables, processing signaling information for a call based on the call routing data in the call processor data tables to transfer a control message for the call indicating a first connection and a second connection; and in an interworking unit, receiving the control message, and in response to the control message, receiving user communications in a first format from a first connection, converting the user communications to a second format, and transferring the user communications in the second format over the second connection.

12. The method of claim 11 wherein receiving and processing the call routing data to fill the control system data tables comprises formatting the call routing data for the call processor data tables.

13. The method of claim 11 wherein the control system data tables and the call processor data tables are identical.

14. The method of claim 11 wherein the control system includes a user interface, and further comprising allowing a user to view the control system data tables.

15. The method of claim 11 further comprising transferring the call routing data from the control system data tables to redundant data tables, and in a redundant processor including the redundant data tables, processing the signaling information for the call based on the call routing data in the redundant data tables to transfer the control message for the call.

16. The method of claim 11 wherein the control system data tables and the call processor data tables each include a called number table.

17. The method of claim 11 further comprising transferring accounting information for the call from the call processor to the control system.

18. The method of claim 11 further comprising transferring alarm information for the call from the call processor to the control system.

19. The method of claim 11 wherein the first connection comprises a DS0 connection.

20. The method claim 11 wherein the second connection comprises a virtual connection.

* * * * *